United States Patent
Chartouni et al.

(10) Patent No.: US 9,536,314 B2
(45) Date of Patent: Jan. 3, 2017

(54) IMAGE RECONSTRUCTION

(75) Inventors: Mathieu Chartouni, Sainte-Foy-d'Aigrefeuille (FR); Liron Yatziv, Fremont, CA (US); Julian Ibarz, Plainsboro, NJ (US); Chen-Rui Chou, San Jose, CA (US); Atilla Peter Kiraly, Plainsboro, NJ (US); Christophe Chefd'hotel, Jersey City, NJ (US)

(73) Assignee: SIEMENS MEDICAL SOLUTIONS USA, INC., Malvern, PA (US)

( * ) Notice: Subject to any disclaimer, the term of this patent is extended or adjusted under 35 U.S.C. 154(b) by 540 days.

(21) Appl. No.: 13/276,441

(22) Filed: Oct. 19, 2011

(65) Prior Publication Data
US 2012/0098832 A1  Apr. 26, 2012

Related U.S. Application Data

(60) Provisional application No. 61/394,821, filed on Oct. 20, 2010, provisional application No. 61/528,827, filed on Aug. 30, 2011.

(51) Int. Cl.
G06T 7/00 (2006.01)
G06T 17/00 (2006.01)

(52) U.S. Cl.
CPC ............ *G06T 7/0065* (2013.01); *G06T 17/00* (2013.01); *G06T 2200/08* (2013.01); *G06T 2207/10121* (2013.01); *G06T 2207/30021* (2013.01); *G06T 2210/41* (2013.01); *G06T 2211/404* (2013.01)

(58) Field of Classification Search
None
See application file for complete search history.

(56) References Cited

U.S. PATENT DOCUMENTS

| | | | |
|---|---|---|---|
| 6,501,848 B1* | 12/2002 | Carroll et al. | 382/128 |
| 7,103,136 B2* | 9/2006 | Claus et al. | 378/4 |
| 7,515,743 B2 | 4/2009 | Novak | |
| 7,738,626 B2* | 6/2010 | Weese et al. | 378/41 |
| 8,831,309 B2 | 9/2014 | Kiraly | |
| 2003/0220555 A1* | 11/2003 | Heigl et al. | 600/407 |
| 2005/0152591 A1* | 7/2005 | Kiraly et al. | 382/131 |
| 2009/0016587 A1* | 1/2009 | Strobel et al. | 382/130 |

OTHER PUBLICATIONS

Wojciech Matusik, Chris Buehler, Ramesh Raskar, Steven J. Gortler, and Leonard McMillan, "Image-Based Visual Hulls", Jul. 27, 2000, ACM, Proceedings of the 27th Annual Conference on Computer Graphics and Interactive Techniques, pp. 369-374.*

(Continued)

*Primary Examiner* — Robert Bader

(57) ABSTRACT

A method for reconstructing a three-dimension image includes receiving a plurality of two-dimensional images and projection information of the two-dimensional images, projecting a plurality of rays onto the plurality of two-dimensional images, determining correspondence information between pixels of different ones of the plurality of two-dimensional images, determining a value of each of the pixels, and reconstructing a three-dimension image by integrating the plurality of rays, wherein a position on each ray can be associated to one pixel of the plurality of two-dimensional images.

21 Claims, 3 Drawing Sheets

(56) References Cited

OTHER PUBLICATIONS

Ming Li, Marcus Magnor, Hans-Peter Seidel, "Hardware-Accelerated Visual Hull Reconstruction and Rendering", 2003, Proceedings of Graphics Interface '03, pp. 65-71.*

Erik Franken, Peter Rongen, Markus van Almsick, and Bart ter Haar Romeny, "Detection of Electrophysiology Catheters in Noisy Fluoroscopy Images", Oct. 6, 2006, Springer-Verlag, Medical Image Computing and Computer-Assisted Intervention—MICCAI 2006, Lecture Notes in Computer Science, vol. 4191, 2006, pp. 25-32.*

Remo Ziegler, Wojciech Matusik, Hanspeter Pfister, and Leonard McMillan, "3D Reconstruction Using Labeled Image Regions", Jun. 25, 2003, Proceedings of the 2003 Eurographics/ACM SIGGRAPH symposium on Geometry Processing, pp. 248-259.*

Martin Spiegel, Marcus Pfister, Dieter Hahn, Volker Daum, Joachim Hornegger, Tobias Struffert, Arnd Dorfler, "Towards Real-time Guidewire Detection and Tracking in the Field of Neuroradiology", Mar. 13, 2009, SPIE, Medical Imaging 2009: Visualization, Image-Guided Procedures, and Modeling.*

* cited by examiner

IMAGE RECONSTRUCTION

CROSS-REFERENCE TO RELATED APPLICATION

This is a non-provisional application claiming the benefit of U.S. provisional application Ser. No. 61/394,821, filed Oct. 20, 2010 and U.S. provisional application Ser. No. 61/528,827, filed Aug. 30, 2011 the contents of which are incorporated by reference herein in their entirety.

BACKGROUND

1. Technical Field

The present disclosure relates to image reconstruction, and more particularly to methods for 3D reconstruction using 2D images.

2. Discussion of Related Art

Reconstruction of three-dimensional (3D) scenes is a computationally expensive procedure. Therefore, real time-reconstruction techniques are limited by the speed of the reconstruction. For example, it may be difficult to reconstruct a 3D scene having fast moving objections.

BRIEF SUMMARY

According to an embodiment of the present disclosure, a method for reconstructing a three-dimension image includes receiving a plurality of two-dimensional images and projection information of the two-dimensional images, projecting a plurality of rays onto the plurality of two-dimensional images, determining correspondence information between pixels of different ones of the plurality of two-dimensional images, determining a value of each of the pixels, and reconstructing a three-dimension image by integrating the plurality of rays, wherein a position on each ray can be associated to one pixel of the plurality of two-dimensional images.

According to an embodiment of the present disclosure, a method for reconstructing a three-dimension image includes receiving a plurality of two-dimensional images, filtering the two-dimensional images to produce filtered images in which an instrument is identified, determining a local maxima in each of the filtered images, differentiating the local maxima in each of the filtered images to produced unique candidates, and performing a multi-channel three-dimensional reconstruction using a plurality of rays projected through the two-dimensional images, wherein the rays create no response for regions of the differentiated local maxima.

BRIEF DESCRIPTION OF THE DRAWINGS

Preferred embodiments of the present disclosure will be described below in more detail, with reference to the accompanying drawings.

DETAILED DESCRIPTION OF PREFERRED EMBODIMENTS

According to an embodiment of the present disclosure, a 3D scene rendering method may create a reconstruction directly form multiple 2D projections. The 3D scene rendering may prioritize the reconstruction of a current viewpoint over a full-volume reconstruction.

Figure 1:
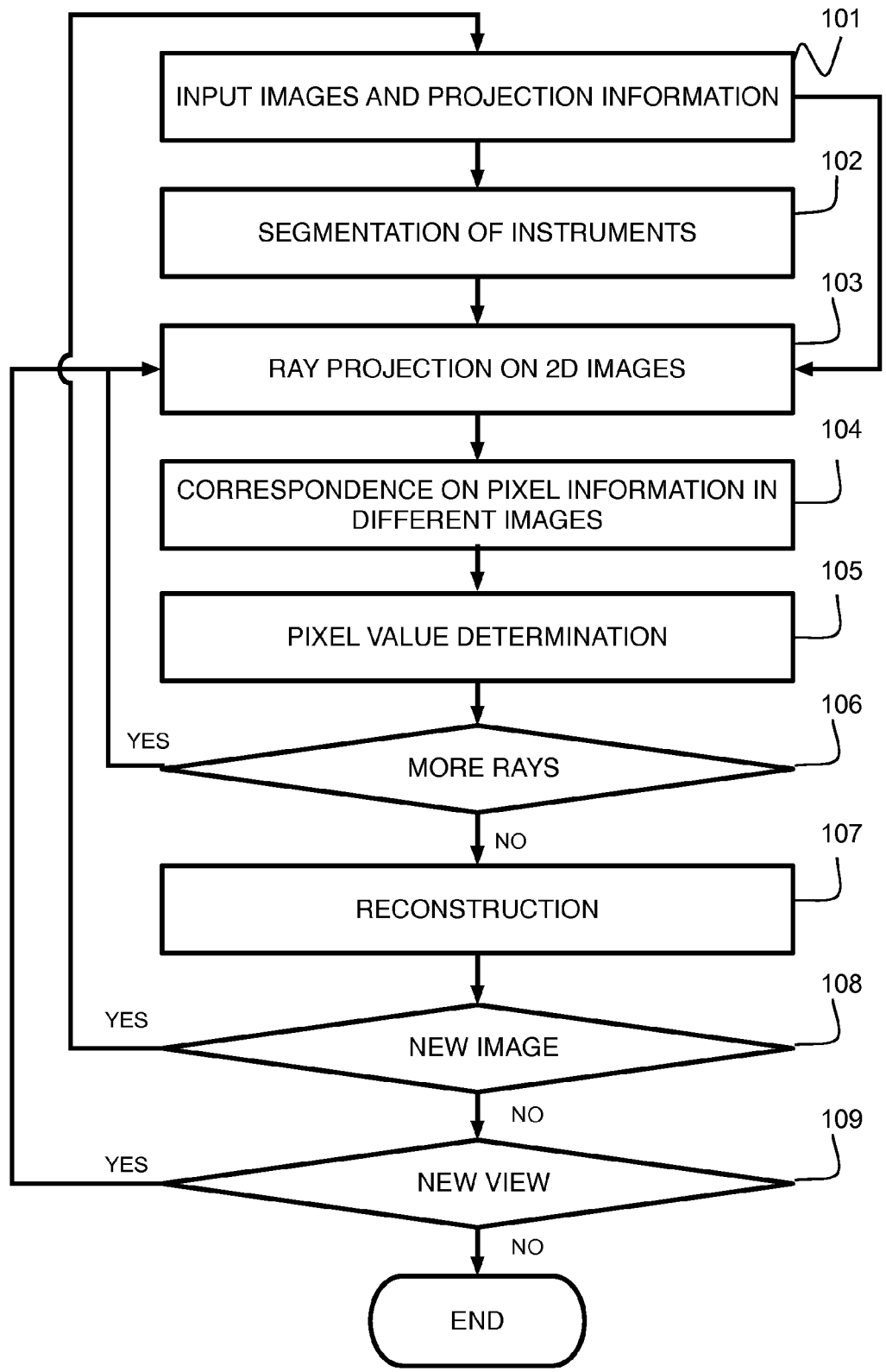
FIG. 1 is a flow diagram showing a method for reconstruction by projected ray-casting according to an embodiment of the present disclosure.

Referring to FIG. 1, an exemplary method for 3D reconstruction of a simultaneous fluoroscopy is shown. According to the method of FIG. 1, a view direction may be changed between a changing 3D scene and a user selected view direction in real-time making. To a user, it appears that the volume has been reconstructed. The 3D scene rendering method may use volume ray casting, yet the volume is not necessary. The 3D scene rendering method may be used to reconstruct the volumetric information directly from 2D images.

An exemplary 3D scene rendering method includes loading or receiving images and projection information (101), segmenting instruments (102), and a ray projection on 2D images (103), wherein the ray projection is iterated over the rays (104). The exemplary method further includes a determination of correspondence on pixel information in different images (105), a pixel value determination (106), and a reconstruction (107).

More particularly, images and projection information are received (101) including projection information of all cameras used to acquire the 2D images. For example, the projection information for an x-ray beam direction in the case of 2D projections of a 3D object may be proportional to a summed attenuation coefficient and to a length traveled by the ray through a volume including, for example, a patient and an instrument such as a catheter.

The segmentation of the instruments (102) is optional. The segmentation includes a detection and segmentation for extracting an instrument, such as a catheter. The segmentation may be based on various parameters, including for example, the attenuation coefficients or pixel intensity, to differentiate the instrument from patient tissue. The segmentation may improve results and scatter reconstruction, which may lead to faster and more robust reconstructions.

Ray projection on the 2D images (103) includes projecting a casted ray onto the 2D images for every pixel of a rendered image. Each ray creates a line. A position on the casted ray, in 3D, is a point on the projected ray (line) on every image. The determination of correspondence of pixel information in different images (104) may include a determination of standard deviation, normalized cross-correlation, etc., applied to the pixel information of the different images to determine the correspondence there-between.

The pixel value determination (105) includes determining a value of the rendered pixel, which may be updated. This can be done by an accumulation of the correspondent pixel values on the 3D ray. The accumulation may be an multiplication, addition, average, etc. The value may also be opacity or intensity. It is not necessary to iterate over the whole ray since the area of the volumetric information may be determined. The bounds of the ray integration may be varied in order to obtain an efficient reconstruction. The ray projection may be iterated over all of the rays (106), wherein 3D rays are integrated. Thereby, a position on a projected ray can be associated to a pixel of the image it is projected on. The reconstruction (107) may be rendered as a texture including the pixels determined earlier.

The exemplary method may be executed in real-time as new images are obtained (108). The rendering is a view looking at the reconstructed 3D scene, and if the view is move the method is applied to determine a new rendering (109).

Figure 2A:
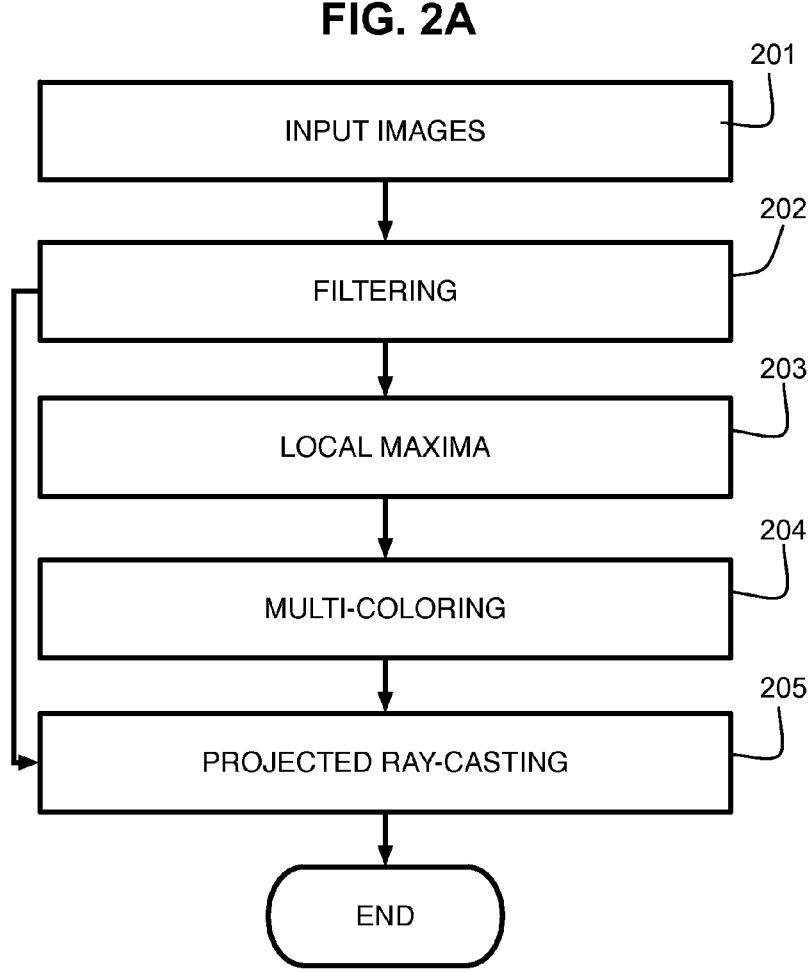
FIG. 2A is a flow diagram showing a method of reconstruction for an electrophysiology application according to an embodiment of the present disclosure.
Figure 2B:
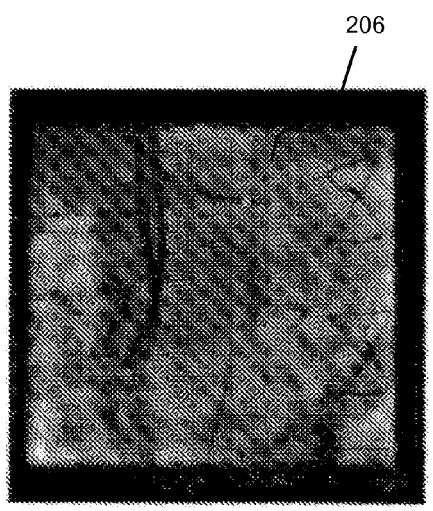
FIGS. 2B-C are exemplary results of a method of reconstruction for an electrophysiology application according to an embodiment of the present disclosure.
Figure 2C:
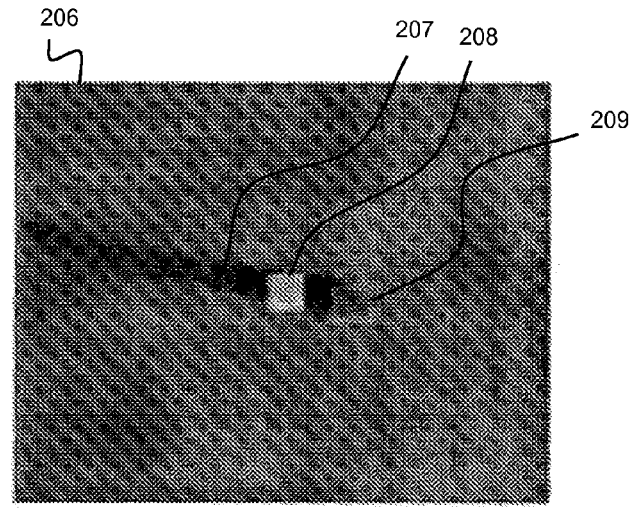

Referring to FIGS. 2A-C, in the context of an electrophysiology (EP) study (e.g., used to diagnose and treat heart arrhythmia), a catheter may be extended through a patient's blood vessels to reach the heart may be used. The catheter may include electrodes for ablating specific sections of the pulmonary veins. Bi-plane and mono-plane x-ray fluoro images may be used to give a physician feedback during a procedure.

An EP-suite software package may be used annotating multi-model 3D images of the patient and overlaying the 3D images on the fluoro images. These composite images can help the physician to batter locate the correct region to ablate.

In this context, real-time catheter reconstruction can be used to provide 3D reconstructions of the catheter and give 3D views of an operating environment. According to an embodiment of the present disclosure, a method for catheter tracking may include a filter-based method to highlight electrodes within fluoro images and a following 3D reconstruction with a coloring scheme. The method may be processed in real-time with graphics processor (GPU) acceleration on the 3D reconstruction.

According to an embodiment of the present disclosure and FIG. 2A, a method for catheter tracking includes receiving input fluoro images (201), filtering the images (202) to produce filtered images, determining local maxima in the filtered images (203), a multi-coloring of the input images (204) to produced colored candidates, a multi-channel 3D reconstruction using projected ray-casting (205) through either the filtered images or the colored images. The method avoids ghosting artifacts while preserving real-time reconstruction.

The filtering (202) may include a candidate generation filter used for polyp detection in Computed Tomography (CT) datasets know as the MARS (Magnitude, Angle, Radius, Size) filter. Given a 3D location x, within the volume V to be processed, the MARS filter determined a value that highlights spherical objects.

A general equation for the MARS filter may be given as:

$$M(x) = \frac{\int_{\forall y \in V'} S(m, \theta, r, y) \Delta y}{T(V')} \quad (1)$$

where M(x) refers to the output of the MARS filter at location x. y is another location in the volume. M is the magnitude of the gradient at location y, r is the radial distance from y to x, and θ is the angle between the gradient at location y and the ray from x to y. The integral proceeds over a defined subset volume V' of the original V. The main function S defines how the values will be weighted at each individual point and summed within the integral. The function T provides a weighting based on the sixe of the given volume. Hence, the definition of S determines specific properties of the filter. This filter was modified to allow for an improved detection of circular objects by rewarding regions with symmetrical gradients.

Parameters of equation (1) may be tuned to improve results. Tuning may be done automatically given approximate positions of the electrode, for example, by user inputs and an approximate electrode size.

Optionally, the method may include a determination of local maxima in the filtered images (203), for example, in an image including a catheter having electrodes, the determination of local maxima may identify the electrodes as grouped candidates in the results. For example, in a high response region, local maxima may be identified as electrodes. It should be noted that the determination of local maxima (203) may be performed by other methods such as indicating only points that satisfy a certain error for a least-squares fit of a line may be used. The filtering may reduce ghosting artifacts.

Optionally, the ghosting artifacts may be further reduced by the multi-coloring of the input images (204). It should be noted that color is used as means for labeling, and that other labels may be used. In the context of processing by a Graphics Processor (GPU), color labels may be processed efficiently. FIG. 2B shows an exemplary colored image (shown in grey-scale). The image includes a localized region (206). According to an embodiment of the present disclosure, the images may be uniquely colored, wherein the projected ray-casting creates no response for regions of different colors. For example, a red region in an A plane produces no response in a green region in a B plane. Coloring detected electrodes individually with red, green, and blue primitive colors reduces or eliminates ghosting. For example, a head electrode may be colored red, while a bottom electrode is colored blue, and a middle electrode is colored green in the 2D planes (input images).

After the electrodes are colored in the 2D planes, a multi-channel 3D reconstruction method (205) may be applied to visualize the electrodes in 3D without any artifact or ghosting (for example, see FIG. 1). The multi-channel 3D reconstruction method (204) projects color texture values of the 2D electrodes along the normal direction of each plane and renders the intersected color in 3D. The electrodes can be uniquely located by using primitive colors. For example, the inner products are always zeros between primitive color vectors. Moreover, the multi-channel reconstruction allows parallel reconstruction. For example, by using three primitive colors, reconstruction of the electrodes may be simultaneously performed.

FIG. 2C shows the localized region (206) including three identified electrodes. For example, a bottom electrode (207) may be colored blue, a middle electrode (208) green, and a head electrode (209) red in an output 3D reconstruction.

The method of FIG. 2A may be performed using input images captured at 125 ms per frame (8 frames per second). This time may be reduced by further optimizations, for example, GPU acceleration for the MARS filter.

Computer vision approaches to catheter tracking offer the possibility of the same benefits as magnetic tracking without the need for modification (e.g., hardware to magnetically locate the catheter).

Catheter reconstruction using projected ray-casting affords 3D reconstruction from two fluoro images taken at different angles. By using an accumulated intersection of rays from more radio-opaque regions, a 3D reconstruction of different objects may be obtained. The disadvantage is that ghosting artifacts can be present when images are taken at wide angles apart from each other. The method of FIG. 2 addresses these issues to reduce or eliminate ghosting in real-time reconstructions.

It is to be understood that embodiments of the present disclosure may be implemented in various forms of hardware, software, firmware, special purpose processors, or a combination thereof. In one embodiment, a software application program is tangibly embodied on a non-transitory computer-readable storage medium, such as a program storage device or computer-readable storage medium, with an executable program stored thereon. The application program may be uploaded to, and executed by, a machine comprising any suitable architecture.

Figure 3:
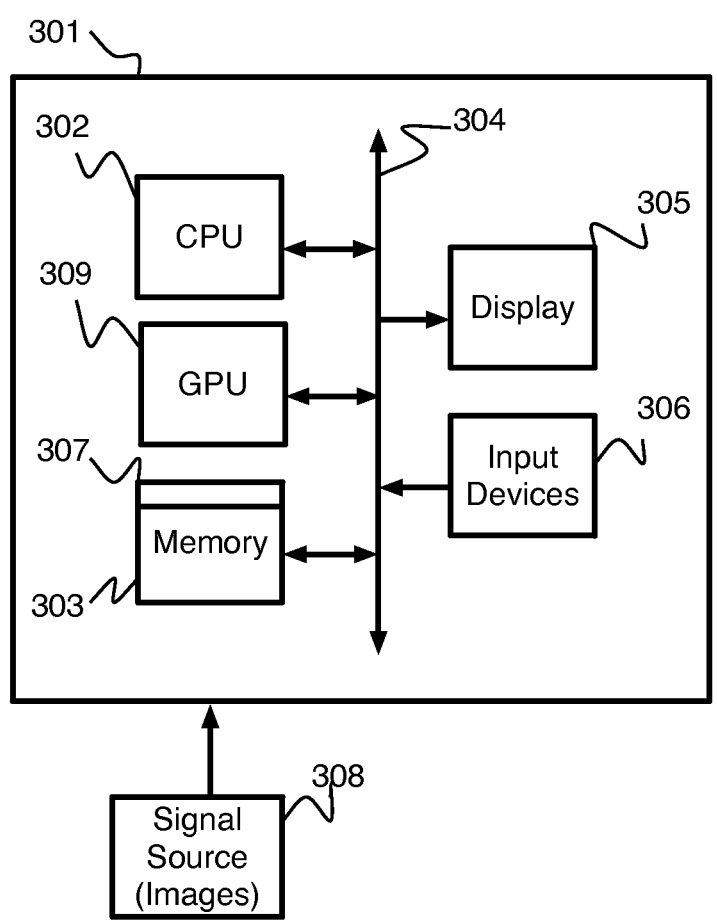
FIG. 3 is a diagram of a system for image reconstruction according to an embodiment of the present disclosure.

Referring to FIG. 3, according to an embodiment of the present disclosure, a computer system (block 301) for performing an image reconstruction includes, inter alia, a CPU (block 302), a memory (block 303) and an input/output (I/O) interface (block 304). The computer system (block 301) is generally coupled through the I/O interface (block 304) to a display (block 305) and various input devices (block 306) such as a mouse, keyboard, medical scanners, power equipment, etc. The display (block 305) may be implemented to display the rules, e.g., as the rules evolve during evaluation, ranking and refinement or as an output set of rules. The support circuits can include circuits such as cache, power supplies, clock circuits, and a communications bus. The memory (block 303) can include random access memory (RAM), read only memory (ROM), disk drive, tape drive, etc., or a combination thereof. The present invention can be implemented as a module (block 307) of the CPU or a routine stored in memory (block 303) and executed by the CPU (block 302) to process input data (block 308). For example, the data may include image information from a camera, which may be stored to memory (block 303) As such the computer system (block 301) is a general purpose computer system that becomes a specific purpose computer system when executing the routine of the present disclosure. The computer system (block 301) may further include a GPU (block 309) for image processing.

The computer platform (block 301) also includes an operating system and micro instruction code. The various processes and functions described herein may either be part of the micro instruction code or part of the application program (or a combination thereof) which is executed via the operating system. In addition, various other peripheral devices may be connected to the computer platform such as an additional data storage device and a printing device.

It is to be further understood that, because some of the constituent system components and method steps depicted in the accompanying figures may be implemented in software, the actual connections between the system components (or the process steps) may differ depending upon the manner in which the system is programmed. Given the teachings of the present disclosure provided herein, one of ordinary skill in the related art will be able to contemplate these and similar implementations or configurations of the present disclosure.

Having described embodiments for image reconstruction, it is noted that modifications and variations can be made by persons skilled in the art in light of the above teachings. It is therefore to be understood that changes may be made in embodiments of the present disclosure that are within the scope and spirit thereof.

What is claimed is:

1. A method for reconstructing an instrument in three-dimensions in real-time from a plurality of two-dimensional fluoroscopy images, comprising:
   receiving the plurality of two-dimensional fluoroscopy images acquired from a same subject and projection information of the two-dimensional fluoroscopy images;
   filtering the two-dimensional fluoroscopy images to produce a plurality of filtered images in which the instrument is identified;
   determining a local maxima in each of the plurality of filtered images;
   differentiating the local maxima using primitive color vector values in each of the plurality of filtered images to produce unique candidates; and
   simultaneously performing a multi-channel, parallel three-dimensional reconstruction of the instrument using a plurality of rays projected through two of the two-dimensional fluoroscopy images,
   wherein each ray projects a texture color vector value of one of the two-dimensional images along a normal direction of said two-dimensional image,
   wherein intersecting rays create a response in the multi-channel three-dimensional reconstruction by multiplying the color vector values of the intersecting rays,
   wherein the rays create no response for regions of the differentiated local maxima due to inner products between primitive color vector values resulting in zeros, and the multi-channel three-dimensional reconstruction is displayed by rendering the intersections including the instrument, wherein ghosting artifacts are eliminated.

2. The method of claim 1, wherein filtering the two-dimensional fluoroscopy images includes calculating a MARS filter $$M(x) = \frac{\int_{\forall y \in V_r} S(m, \theta, r, y) \Delta y}{T(V')},$$

wherein V' is a volume of integration, M(x) denotes an output of the MARS filter at location x, y is another location in the volume V', m is a magnitude of a gradient at location y, r is a radial distance from y to x, θ is an angle between the gradient at location y and a ray from x to y, function S defines how values will be weighted at each individual pixel and summed within the integral, and function T is a weighting based on a size of volume V'.

3. The method of claim 1, wherein differentiating the local maxima in each of the plurality of filtered images to produced unique candidates comprises coloring the local maxima in each of the plurality of filtered images to produced colored candidates.

4. The method of claim 1, further comprising segmenting the plurality of two-dimensional fluoroscopy images to detect the instrument in the two-dimensional fluoroscopy images.

5. The method of claim 1, wherein pixel values of correspondent pixel are accumulated on each of the rays.

6. The method of claim 1, wherein the value of each of the pixels is one of an opacity or intensity.

7. The method of claim 5, further comprising localizing accumulating to a portion of each ray in a predetermined area of the volumetric information.

8. The method of claim 7, wherein the portion of each ray is variable between different rays.

9. The method of claim 1, the method further comprising repeating the method upon obtaining new fluoroscopy images.

10. The method of claim 1, the method further comprising repeating the method upon receiving a request for a new view.

11. The method of claim 1, wherein the instrument is a catheter.

12. A non-transitory program storage device readable by a computer, tangibly embodying a program of instructions executable by the computer to perform a method for reconstructing an instrument in three-dimensions in real-time from a plurality of two-dimensional fluoroscopy images, comprising:
  receiving the plurality of two-dimensional fluoroscopy images acquired from a same subject and projection information of the two-dimensional fluoroscopy images;
  filtering the two-dimensional fluoroscopy images to produce a plurality of filtered images in which the instrument is identified;
  determining a local maxima in each of the plurality of filtered images;
  differentiating the local maxima using primitive color vector values in each of the plurality of filtered images to produce unique candidates; and
  simultaneously performing a multi-channel, parallel three-dimensional reconstruction of the instrument using a plurality of rays projected through two of the two-dimensional fluoroscopy images,
  wherein each ray projects a texture color vector value of one of the two-dimensional images along a normal direction of said two-dimensional image,
  wherein intersecting rays create a response in the multi-channel three-dimensional reconstruction by multiplying the color vector values of the intersecting rays,
  wherein the rays create no response for regions of the differentiated local maxima due to inner products between primitive color vector values resulting in zeros, and the multi-channel three-dimensional reconstruction is displayed by rendering the intersections including the instrument, wherein ghosting artifacts are eliminated.

13. The program storage device of claim 12, wherein differentiating the local maxima in each of the plurality of filtered images to produced unique candidates comprises coloring the local maxima in each of the plurality of filtered images to produced colored candidates.

14. The program storage device of claim 12, the method further comprising segmenting the plurality of two-dimensional fluoroscopy images to detect the instrument in the two-dimensional fluoroscopy images.

15. The program storage device of claim 12, wherein pixel values of correspondent pixel are accumulated on each of the rays.

16. The program storage device of claim 12, wherein the value of each of the pixels is one of an opacity or intensity.

17. The program storage device of claim 15, further comprising localizing accumulating to a portion of each ray in a predetermined area of the volumetric information.

18. The program storage device of claim 17, wherein the portion of each ray is variable between different rays.

19. The program storage device of claim 12, the method further comprising repeating the method upon obtaining new fluoroscopy images.

20. The program storage device of claim 12, the method further comprising repeating the method upon receiving a request for a new view.

21. The program storage device of claim 12, wherein the instrument is a catheter.

* * * * *